United States Patent
Eskildsen et al.

(10) Patent No.: US 9,953,511 B2
(45) Date of Patent: Apr. 24, 2018

(54) PORTABLE SECURITY DEVICE THAT COMMUNICATES WITH HOME SECURITY SYSTEM MONITORING SERVICE

(71) Applicant: Honeywell International Inc., Morristown, NJ (US)

(72) Inventors: Kenneth Eskildsen, Great Neck, NY (US); Mark Okeefe, San Diego, CA (US); Kevin G. Piel, Ronkonkoma, NY (US)

(73) Assignee: Honeywell International Inc., Morris Plains, NJ (US)

( * ) Notice: Subject to any disclaimer, the term of this patent is extended or adjusted under 35 U.S.C. 154(b) by 112 days.

(21) Appl. No.: 14/855,716

(22) Filed: Sep. 16, 2015

(65) Prior Publication Data
US 2017/0076584 A1 Mar. 16, 2017

(51) Int. Cl.
*G08B 25/01* (2006.01)
*G08B 25/00* (2006.01)
(Continued)

(52) U.S. Cl.
CPC ......... *G08B 25/016* (2013.01); *G06F 21/552* (2013.01); *G08B 25/008* (2013.01); *G08B 25/10* (2013.01); *H04W 12/06* (2013.01); *G06F 21/31* (2013.01); *G06F 2221/2111* (2013.01); *H04L 12/2827* (2013.01)

(58) Field of Classification Search
CPC .... G08B 25/016; G08B 25/008; G08B 25/10; H04L 12/2827
See application file for complete search history.

(56) References Cited

U.S. PATENT DOCUMENTS

| 4,742,336 A | 5/1988 | Hall et al. |
| 5,570,079 A | 10/1996 | Dockery |

(Continued)

FOREIGN PATENT DOCUMENTS

| WO | 9849663 | 11/1998 |
| WO | 2014176379 | 10/2014 |
| WO | 2015042572 A1 | 3/2015 |

OTHER PUBLICATIONS

European Search Report for EP Application No. 16188431.7, dated Feb. 13, 2017.
Vibsolas gea User Manual, Issue 1.41, 80 pages, Sep. 12, 2013.

*Primary Examiner* — Mohamed Barakat
(74) *Attorney, Agent, or Firm* — Seager, Tufte & Wickhem, LLP

(57) ABSTRACT

A security system may include a home security system that is connected to a remote monitoring service as well as a portable security device that can travel with an individual when they are away from home. The portable security device may communicate with the same monitoring service as the home security system, and may in fact be linked to the same user account as that used for their home security system. The home security system may thus be extended to cover a remote location. In some cases, occupants of an individual's home may be notified via the home security system of alert conditions detected by the portable security device at the remote location. Likewise, occupants of the remote location may be notified via the portable security device of alert conditions detected in the home by the home security system.

18 Claims, 7 Drawing Sheets

(51) Int. Cl.
  *G08B 25/10* (2006.01)
  *H04W 12/06* (2009.01)
  *G06F 21/55* (2013.01)
  *H04L 12/28* (2006.01)
  *G06F 21/31* (2013.01)

(56) References Cited

U.S. PATENT DOCUMENTS

| | | |
|---|---|---|
| 5,777,551 A | 7/1998 | Hess |
| 5,926,103 A | 7/1999 | Petite |
| 6,002,427 A | 12/1999 | Kipust |
| 6,154,130 A | 11/2000 | Mondejar et al. |
| 6,577,234 B1 | 6/2003 | Dohrmann |
| 7,026,928 B1* | 4/2006 | Lane ............... G08B 21/02 340/426.1 |
| 7,113,090 B1* | 9/2006 | Saylor ............ G08B 13/19682 340/5.33 |
| 7,755,480 B2 | 7/2010 | Aritsuka et al. |
| 8,638,211 B2 | 1/2014 | Cohn et al. |
| 8,643,486 B2* | 2/2014 | Hess ............... G08B 13/1409 340/508 |
| 9,332,040 B2 | 5/2016 | Logue et al. |
| 2006/0187024 A1* | 8/2006 | Azimi ............. G08B 13/181 340/539.1 |
| 2007/0279209 A1* | 12/2007 | Kogan ............. B60R 25/1004 340/506 |
| 2012/0262289 A1* | 10/2012 | French, II ....... G08B 25/009 340/539.11 |
| 2014/0313032 A1 | 10/2014 | Sager et al. |
| 2014/0320280 A1 | 10/2014 | Sager et al. |
| 2014/0320281 A1 | 10/2014 | Sager et al. |
| 2015/0084757 A1* | 3/2015 | Annibale ......... G08B 25/10 340/436 |
| 2015/0097689 A1* | 4/2015 | Logue ............. G08B 25/10 340/632 |
| 2015/0199897 A1 | 7/2015 | Hammadou |
| 2015/0339912 A1 | 11/2015 | Farrand et al. |
| 2016/0012702 A1* | 1/2016 | Hart ............... G08B 21/043 340/584 |

* cited by examiner

PORTABLE SECURITY DEVICE THAT COMMUNICATES WITH HOME SECURITY SYSTEM MONITORING SERVICE

TECHNICAL FIELD

The disclosure pertains generally to security systems and more particularly to security systems that provide an individual security at more than one disparate locations.

BACKGROUND

People often have security systems that provide an increased level of security in their homes. Many of these security systems are in communication with monitoring services that can alert the homeowner and/or the authorities if a security event is detected. Security events can include, for example, an intrusion event, a smoke event, a fire event, a water leak event and/or any other suitable security event. Such security systems provide the people with an increased security level at home. However, when people are away from their home, such as when staying at a hotel, a vacation home, or a dorm, the increased security level enjoyed at home is lost. What would be desirable is to extend the peace of mind associated with a home security system to a remote location in which a person may be temporarily residing.

SUMMARY

The present disclosure pertains generally to security systems, and more particularly to portable security devices that may enable an individual to travel with the sense of security they enjoy at home. An example of the disclosure may be found in a portable security device that is configured to be hand carried to a space that is remote from a home outfitted with a home security system. The home security system is linked to a user account of a security system monitoring service. The portable security device may include a portable housing that is configured to be hand carried to a remote space that is remote from the home, and a sensor that is secured relative to the portable housing and that is configured to detect one or more predetermined conditions in the remote space. A local alert device may be secured relative to the housing to provide a local alert in the remote space. A memory may store account information suitable for linking the portable security device to the same user account of the security system monitoring service as the home security system. A communications module may be secured relative to the housing. A controller that is coupled to the sensor, the local alert device, the memory, and the communications module, may be secured relative to the housing. In some cases, the controller may be configured to provide a localized alert via the local alert device when the sensor detects one or more of the predetermined conditions in the remote space. The controller may be further configured to use the account information stored in the memory and the communication module to communicate with and notify the security system monitoring service when one or more of the predetermined conditions is detected by the sensor so as to effectively extend the user account linked to the home security system to include the remote space.

Another example of the disclosure may be found in a security system monitoring server. The server may include a memory and a controller that is operably coupled to the memory. The memory may store a plurality of user accounts, each user account including information about a corresponding customer as well as a link to a security system that protects a building associated with the user account (e.g. a customer's home). At least one of the user accounts that include a link to a security system also includes a link to a portable security device, where the portable security device is configured to be hand carried by a user to a space that is remote from the building associated with the user account. In some cases, during setup in the remote location, the physical location of the portable security device may be reported to and stored in the user account of the security system monitoring server. The controller may be configured to receive alert conditions from the security systems and the portable security devices that are linked to the plurality of user accounts. For each alert condition received from the security systems, the controller may output an indication of the alert condition along with at least some of the information associated with the corresponding user account to personnel of the monitoring service. Likewise, for each alert condition received from the portable security devices, the controller may output an indication of the alert condition along with at least some of the information associated with the corresponding user account to personnel of the monitoring service.

Another example of the disclosure may be found in a non-transitory computer-readable storage medium with an executable program stored thereon, wherein the executable program instructs a portable security device. The portable security device may have one or more sensors that can sense one or more predetermined conditions around the portable security device and a controller coupled to the one or more sensors to activate the one or more sensors and monitor for one or more predetermined conditions around the portable security device via the one or more activated sensors. If one or more of the predetermined conditions around the portable security device are detected, the executable program instructs the portable security device to send an alert message to a security system monitoring service. The alert message may reference a user account of the security system monitoring service that is also used in conjunction with a home security system of a home that is located remotely from the portable security device.

The above summary is not intended to describe each embodiment or every implementation of the present disclosure. Advantages and attainments, together with a more complete understanding of the disclosure, will become apparent and appreciated by referring to the following description and claims taken in conjunction with the accompanying drawings.

BRIEF DESCRIPTION OF THE DRAWINGS

The disclosure may be more completely understood in consideration of the following description of various illustrative embodiments in connection with the accompanying drawings, in which.

Figure 1:
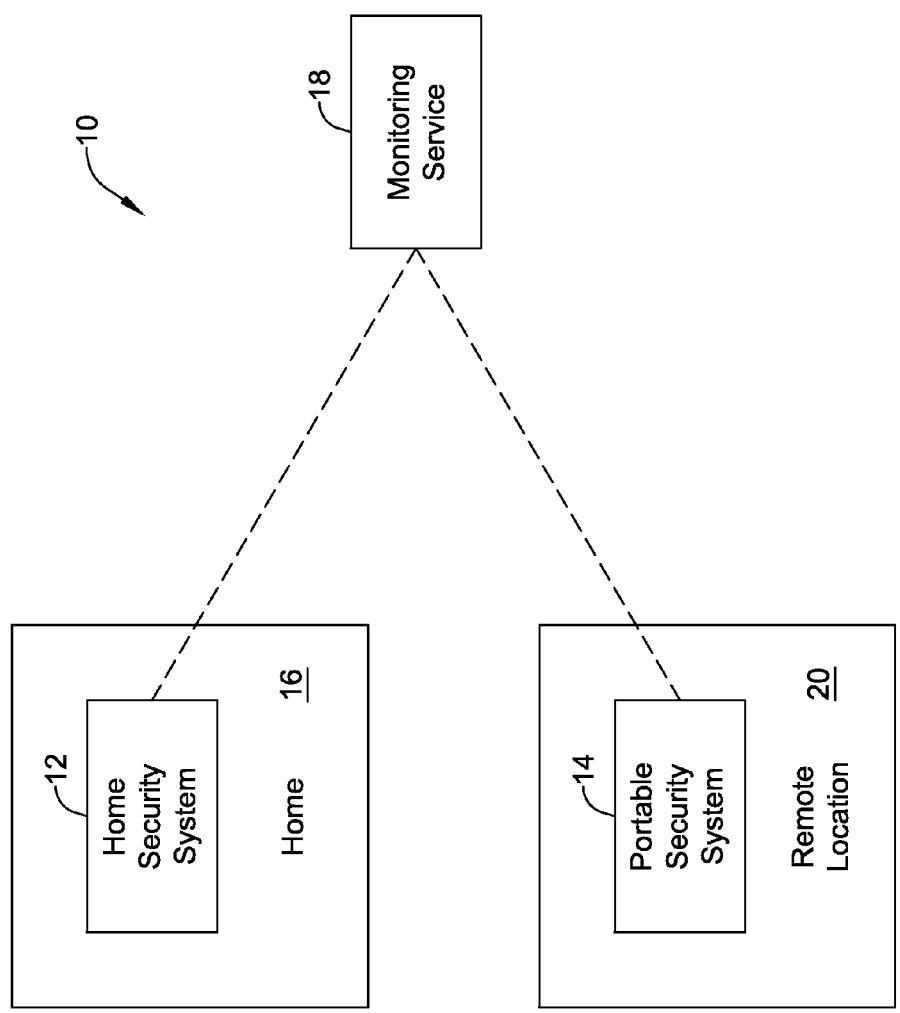
FIG. 1 is a schematic view of an illustrative security system in accordance with an embodiment of the disclosure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Devices or programs that are in communication with one another need not be in continuous communication with each other unless expressly specified otherwise. In addition, devices or programs that are in communication with one another may communicate directly or indirectly through one or more intermediaries.

As used herein, the terms "comprises," "comprising," "includes," "including," "has," "having" or any other variation thereof, are intended to cover a non-exclusive inclusion. For example, a process, method, article, system, or apparatus that comprises a list of features is not necessarily limited only to those features but may include other features not expressly listed or inherent to such process, method, article, system, or apparatus.

The present disclosure pertains generally to security systems that are configured to monitor and protect an individual's property. In some instances, a security system protects a home or apartment and provides alerts if something undesired occurs. Illustrative but non-limiting examples of alert conditions for which a security system may monitor include intrusion, fire, smoke, carbon monoxide alerts, water leaks, and the like. Some security systems provide a localized alert, or perhaps alert an individual via a smart phone application. In some cases, a security system may include remote monitoring. In remote monitoring, the security system, including any sensors that are disposed within the protected property, is monitored from a remote monitoring location. A remote monitoring system or service may include a server or the like that receives information (e.g. alerts) from the security system, and in response, the remote monitoring service may contact the homeowner and/or alert the authorities as needed. In many cases, the security system provides an individual with a sense of security while at home. In some cases, and as detailed herein, such a security system may be extended to provide the individual with a sense of security when at a remote location such as in a hotel room.

FIG. 1 is a schematic diagram of an illustrative security system 10 that includes both a home security system 12 and a portable security system 14. As illustrated, the home security system 12 is located within a home 16 (or other building). In some cases, the home security system 12 may include one or more sensors that are hard-wired or wirelessly connected to a security controller that monitors the one or more sensors. If the home security system 12 detects an alert condition (e.g. intrusion, fire, smoke, carbon monoxide alerts, water leaks, and the like), the home security system 12 may alert a remote monitoring service 18. The remote monitoring service 18 may then attempt to contact the homeowner and/or alert the authorities. In some cases, the remote monitoring service 18 may first try to contact the homeowner in order to reduce false positives.

When an individual leaves the home 16 and travels to a remote location 20, such as a hotel room, they may bring along the portable security system 14. In some cases, as will be discussed, the portable security system 14 may simply be a mobile device such as a smart phone, tablet or other device running a security application program. In other cases, the portable security system 14 may be a dedicated portable security device.

It will be appreciated that many mobile devices include cameras, microphones, motion sensors and the like. In some instances, the portable security system 14 may be a portable security device that includes a variety of components that, in combination, provide the individual with an enhanced level of security at the remote location. If the portable security system 14 detects an alert condition, the portable security system 14 may alert the remote monitoring service 18. Depending on the nature of the alert condition, the remote monitoring service 18 may immediately alert the authorities, or in some cases may first try to contact the individual for confirmation of the alert condition. In some cases, the portable security system 14 itself may try to contact the individual, such as through a text message, email, phone call or the like. While the remote monitoring service 18 is shown in FIG. 1 as communicating with a single home security system 12 and a single portable security system 14, it will be appreciated that the remote monitoring service 18 will typically be in communication with any number of home security systems and/or portable security systems associated with other homeowners.

Figure 2:
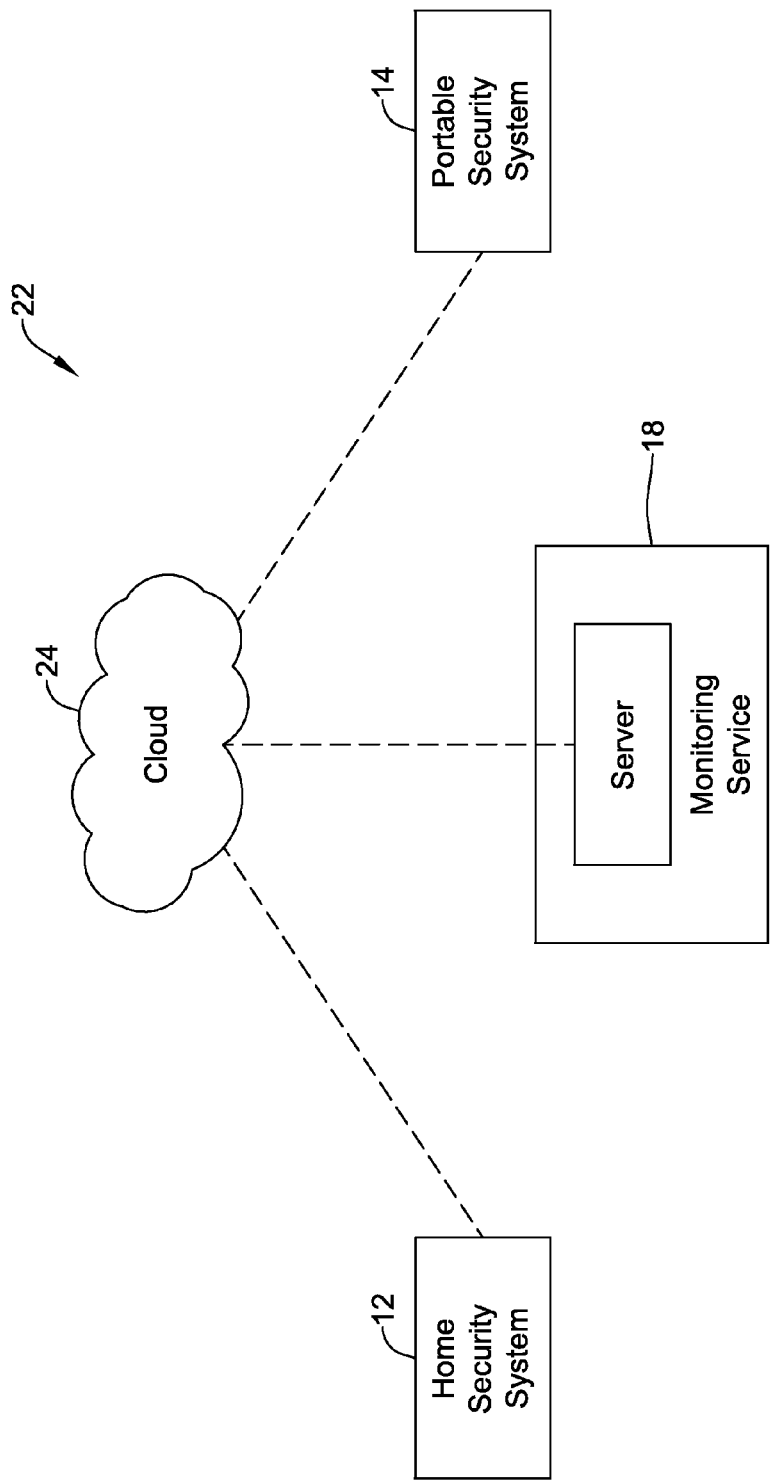
FIG. 2 is a schematic view of an illustrative security system in accordance with an embodiment of the disclosure.

FIG. 2 is a schematic illustration of a security system 22 that may be considered as being similar to the security system 10 of FIG. 1. In some cases, as illustrated, the home security system 12 and/or the portable security system 14 may communicate with the remote monitoring service 18 via the cloud 24. In some cases, the cloud 24 may include one or more servers. When so provided, the one or more servers may be limited to communication between the home security system 12, the portable security system 14 and the remote monitoring service 18. In other case cases, the one or more servers may also handle other communications such as that pertaining to home automation, HVAC (heating ventilation and cooling) systems, building lighting systems, and the like. While the remote monitoring service 18 is shown in FIG. 2 as communicating with a single home security system 12 and a single portable security system 14, it will be appreciated that the remote monitoring service 18 may be in communication with any number of home security systems and/or portable security systems associated with other homeowners.

Figure 3:
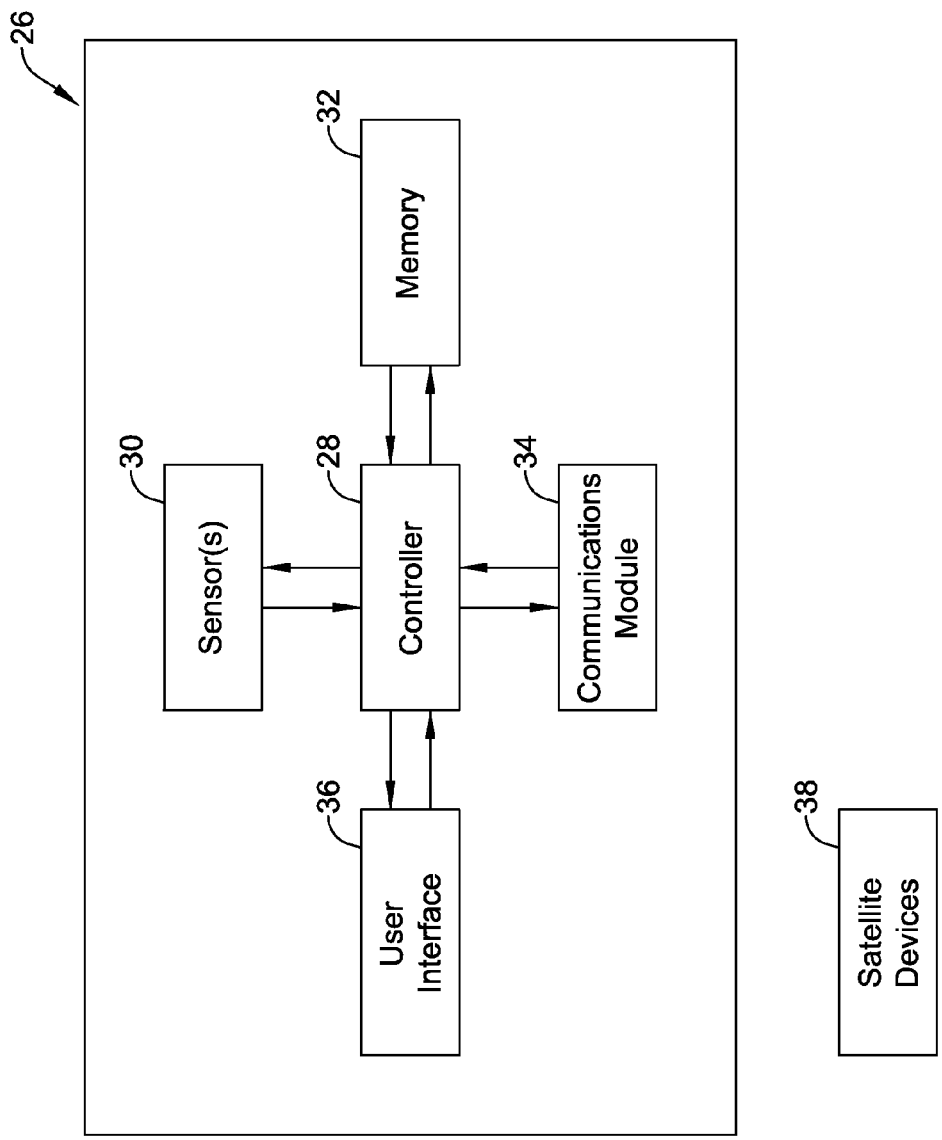
FIG. 3 is a schematic view of an illustrative portable security device useable in the security systems of FIGS. 1 and 2.

FIG. 3 is a schematic diagram of an illustrative mobile device 26 that may be used as the portable security system 14. In some cases, the mobile device 26 may be a smart phone, tablet computer or the like. In FIG. 3, the mobile device 26 includes a controller 28 that is configured to operate the mobile device 26 as well as one or more sensors 30 that are operably coupled to the controller 28. While a single sensor 30 may be used, it will be appreciated that the mobile device 26 may include several distinct sensors. Illustrative but non-limiting examples of sensors 30 may include a camera or other visual recording device, a microphone that can detect, for example, the sound of glass breaking, voices, footsteps, door movement, and/or other sounds, a motion sensor, etc. In some cases, a motion sensor may include an accelerometer, a gyroscope or the like that may be used to detect motion of the mobile device 26 itself. In some cases, the motion sensor may detect motion of other objects within a field of view of the mobile device. For example, the motion sensor may include a passive infrared, ultrasonic or other similar motion sensor. In some cases, the motion sensor may include a camera and an image processor, wherein the image processor may process successive images captured by the camera to detect changes in the field of view that indicate motion of objects within the field of view. These are just some example sensors.

In some cases, the sensor(s) 30 may remain activated at all times that the mobile device 26 is functioning as a portable security system 14. Alternatively, an in some instances, the controller 28 may periodically turn one or more of the sensor(s) 30 "on" for a period of time to check for an alert condition, and if no alert condition is detected, turn the one or more sensor(s) "off" for a period of time to conserve power. In some instances, the mobile device 26 may include a memory 32 that is coupled to the controller 28, which may store operating instructions (e.g. application program) and data that cause the mobile device 26 to function as a portable security device. In some cases, such an application program may be downloaded to the mobile device through a download service, such as I-tunes® or the like, In some cases, the memory 32 is configured to store account information that is suitable for linking the mobile device 26 to a common user account of the security system remote monitoring service 18 in which the user's home security system 12 is also linked. This tie to a common user account may extend the user's home security system 12 to cover the remote location protected by the mobile device 26. In some cases, the remote monitoring service 18 may notify occupants of the user's home via the user's home security system 12 (e.g. via a message on a security panel in the user's home) and/or on the user's smartphone or the like of alert conditions detected at the remote location by the mobile device 26. Likewise, the remote monitoring service 18 may notify occupants of the remote location via the mobile device 26 and/or the user's smartphone or the like of alert conditions detected by the home security system 12. In some cases, the user interface 36 (e.g. ring tone, visual alert, etc.) of the mobile device 26 may be activated when an alert condition is detected by either the mobile device 26 or the home security system 12. Likewise, in response to an alert condition, a display provided to personnel of the remote monitoring service 18 may include information regarding both the home security system 12 and the mobile device 26.

In some instances, one of the sensor(s) 30 may include a global positioning service (GPS) that reports the current location of the mobile device. Alternatively, or in addition, the mobile device 26 may be configured to determine its current location via cellular services, triangulation, and/or any other suitable technique. Alternatively, or in addition, the mobile device 26 may determine its current location by accepting entry of a physical address from a user via the user interface 36 of the mobile device 26. The current location of the mobile device 26 may be communicated to the remote monitoring service 18 via the communications module 34.

The mobile device 26 may also include a communications module 34. In some cases, the communications module 34 may provide the mobile device 26 with the ability to make phone calls, send text messages, send email messages, data messages, send video feeds, send sound feeds and/or the like to a device carried by the user and/or to remote monitoring service 18. As noted above, the communications module 34 may be configured to communicate the current location of the mobile device 26 to the remote monitoring service 18 so that the remote monitoring service 18 can, for example, direct authorities to the appropriate location in the event a suitable alert condition is detected. The communications module 34 may be configured to connect with a local wireless network, a local wired network, a cellular network, a telephone network, and/or any other suitable network or communication path.

In some cases, one or more satellite devices 38 may be used in conjunction with the mobile device 26. Such satellite devices 38 may include for example, a door open detector, a motion sensor, a CO sensor, a smoke sensor, a sound sensor and/or any other suitable sensor. Such satellite devices 38 may be placed at strategic places around the remote space, such as adjacent a door, a window and/or other locations. The satellite devices 38 may communicate with the mobile device 26 via the communications module 34, and may provide additional sensing capabilities to the mobile device 26 for detecting alert conditions in the remote space. The satellite devices 38 may communicate with the mobile device 26 via any suitable wired and/or wireless connection including, for example, any combination or portion of, IEEE 802.15-based wireless communication, Zigbee communication, INSETEON communication, X10 communication protocol, Z-Wave communication, Bluetooth communication, WIFI communication, IEEE 802.11-based communication, WiMAX communication, IEEE 802.16-based communication, various proprietary wireless communications, or any combination thereof.

In some instances, the user interface 36 of the mobile device 26 may display an icon that permits an individual to activate or deactivate a security application program, which then causes the mobile device 26 to function as a portable security system. This may be particularly applicable when the mobile device is a smart phone, tablet computer and the like. In some cases, the user interface 36 may, if an alert condition is detected, display another icon that enables the individual to acknowledge the alert condition and instruct the mobile device 26 to send, via the communications module 34, an appropriate message directly to the authorities or to a remote monitoring service such as the remote monitoring service 18. In some cases, the user interface 36 may display yet another icon that enables the individual to delete or terminate the alert. For example, if the individual drops the mobile device 26 after activating the security program, the security program may interpret the movement of the mobile device 26, or the sound the mobile device 26 makes when landing on the floor, as a potential alert condition. The individual may simply tell the mobile device 26 to ignore this detected event.

Figure 4:
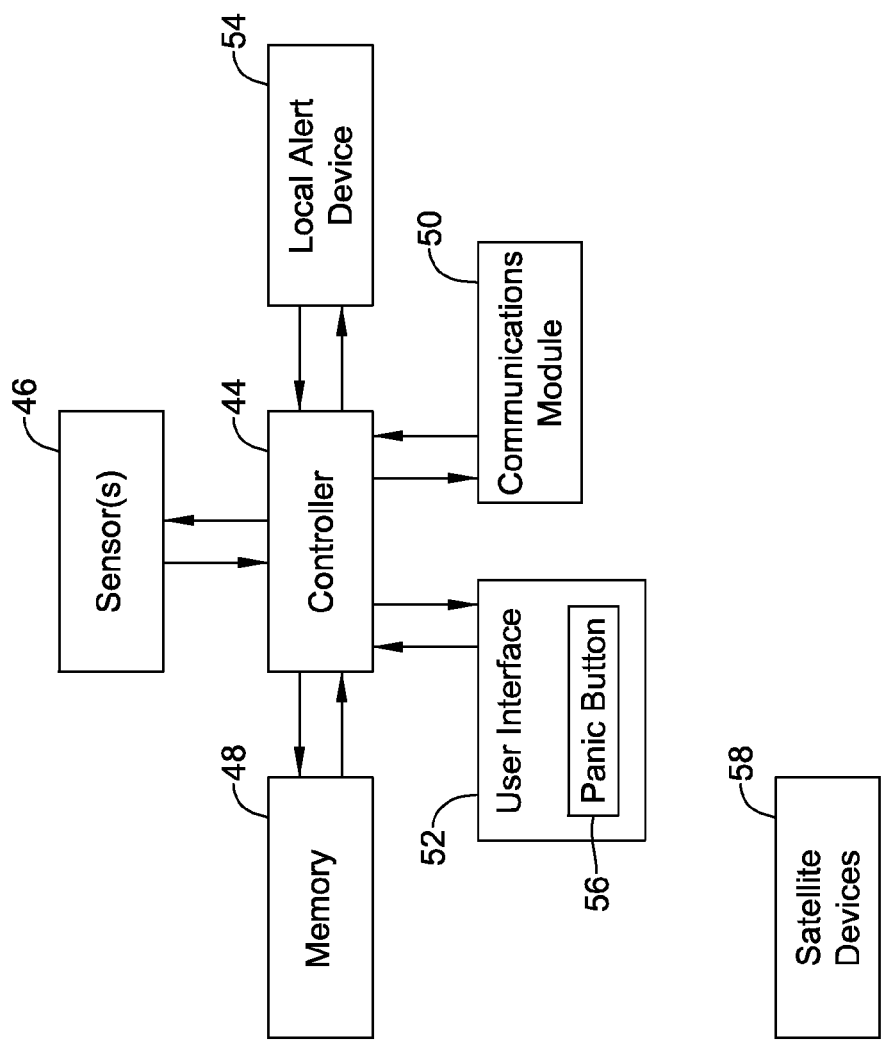
FIG. 4 is a schematic view of an illustrative portable security device useable in the security systems of FIGS. 1 and 2.

In some instances, the portable security system 14 may be a dedicated security device. FIG. 4 provides a schematic diagram of an illustrative portable security device 40 that includes a housing 42 and several components that are arranged in or on the housing 42. In some cases, the housing 42 is configured to be hand carried to a remote space (such as the remote location 20 shown in FIG. 1) that is remote from a home (such as the home 16 shown in FIG. 1) having a home security system linked to a user account of a remote monitoring service 18. Being configured to be hand carried may mean, for example, that the housing 42 has an overall size, shape and/or weight that enables a person to easily grasp the portable security device 40 and carry the portable security device 40 to a remote location. In some cases, the housing 42 may be sized to easily fit into a suitcase, or perhaps a carry-on bag. In some instances, the portable security device 40 may be shipped ahead of the user, and thus may already be located at the remote space awaiting the user. In some cases, for example, a hotel may offer a portable security device 40 in each room, and a user with an appropriate account may simply enter their account information to utilize the portable security device 40.

The illustrative portable security device 40 includes a controller 44 that is configured to operate the portable security device 40, as well as a sensor 46 that is operably coupled to the controller 44. The sensor 46 may, for example, be configured to detect one or more predetermined conditions that may occur within the remote location. While a single sensor 46 is illustrated, it will be appreciated that the portable security device 40 may include several distinct sensors. Illustrative but non-limiting examples of sensors may include a camera or other visual recording device, a microphone that can, for example, detect the sound of glass breaking, voices, footsteps, door movement, and/or other sounds, a motion sensor, a smoke detector, a carbon monoxide (CO) detector, a water sensor, a proximity sensor and the like. In some cases, one or more of the sensors 46 may remain activated at all times. Alternatively, the controller 44 may periodically turn the sensor 46 on for a period of time to check for alert conditions, then turn off for a period of time to conserve power if no alert conditions are detected. In some cases, the portable security device 40 may include a memory 48 operatively coupled to the controller 44 for storing operating instructions and/or data for the portable security device 40.

In some cases, the memory 48 is configured to store account information that is suitable for linking the portable security device 40 to a common user account of the remote monitoring service 18 in which the user's home security system 12 is also linked. This tie to a common user account may extend the user's home security system 12 to cover the remote location protected by the portable security device 40. In some cases, the remote monitoring service 18 may notify occupants of the user's home via the user's home security system 12 (e.g. via a message on a security panel in the user's home) and/or on the user's smartphone or the like of alert conditions detected at the remote location by the portable security device 40. Likewise, the remote monitoring service 18 may notify occupants of the remote location via the portable security device 40 and/or the user's smartphone or the like of alert conditions detected by the home security system 12. In some cases, the user interface 36 (e.g. ring tone, visual alert, etc.) of the portable security device 40 may be activated when an alert condition is detected by either the portable security device 40 or the home security system 12. Likewise, in response to an alert condition, a display provided to personnel of the remote monitoring service 18 may include information regarding both the home security system 12 and the portable security device 40.

In some embodiments, as illustrated, the portable security device 40 may include a communications module 50. The communications module 50 may, for example, provide the portable security device 40 with the ability to make phone calls, send text messages, send email messages, data messages, send video feeds, send sound feeds and/or the like to a device carried by the user and/or to remote monitoring service 18. In some cases, the communications module 50 may be configured to communicate the current location of the mobile device to the remote monitoring service 18 so that the remote monitoring service 18 can, for example, direct authorities to the appropriate location in the event a suitable alert condition is detected. The communications module 50 may be configured to connect with a local wireless network, a local wired network, a cellular network, a telephone network, and/or any other suitable network or communication path.

In some cases, one or more satellite devices 58 may be used in conjunction with the mobile device 40. Such satellite devices 58 may include for example, a door open detector, a motion sensor, a CO sensor, a smoke sensor, a sound sensor and/or any other suitable sensor. Such satellite devices 58 may be placed at strategic places around the remote space, such as adjacent a door, a window and/or other locations. The satellite devices 58 may communicate with the mobile device 40 via the communications module 50, and may provide additional sensing capabilities to the mobile device 40 for detecting alert conditions in the remote space. The satellite devices 58 may communicate with the mobile device 40 via any suitable wired and/or wireless connection including, for example, any combination or portion of, IEEE 802.15-based wireless communication, Zigbee communication, INSETEON communication, X10 communication protocol, Z-Wave communication, Bluetooth communication, WIFI communication, IEEE 802.11-based communication, WiMAX communication, IEEE 802.16-based communication, various proprietary wireless communications, or any combination thereof.

A user interface 52 may enable a user to enter commands into the portable security device 40 as well as to view information displayed on the user interface 52. In some cases, the user interface 52 may be a touch screen display. The user interface 52 may, if an alert condition is detected, display text or an icon that enables the individual to acknowledge the potential problem and instruct the portable security device 40 to send, via the communications module 50, an appropriate message to the authorities and/or a remote monitoring service such as the remote monitoring service 18. The user interface 52 may display text or another icon that enables the individual to delete or terminate the alert.

A local alert device 54 may be secured relative to the housing 42 and may be operably coupled to the controller 44. If the sensor 46 detects one or more predetermined conditions in the remote space that indicate an alert condition, the controller 44 may provide a localized alert via the local alert device 54. The local alert device 54 may include an audible alarm generator such as a speaker or siren. The local alert device 54 may include a visual alarm generator such as a flashing light or a strobe light, for example. In some cases, the local alert device 54 may provide an audible alarm as well as a visual alarm. The controller 44 may also be configured to use account information stored in the memory 48 to communicate with and notify the remote monitoring service 18 when one or more of the predetermined conditions is detected by the sensor 46 so as to extend the user account linked to the user's home security system 12 to include the remote space protected by the portable security device 40. In some cases, the controller 44 may also send a message to an individual's mobile device alerting them to the one or more predetermined conditions and/or corresponding alert conditions.

In some instances, a panic button 56 may be operably coupled to the controller 44. If an individual positioned near the portable security device 40 hears a noise, for example, or sees an intruder, or perhaps smells something funny, they can press the panic button 56. In response, the portable security device 40 may send a panic message to directly local authorities and/or to the remote monitoring service 18.

Figure 5:
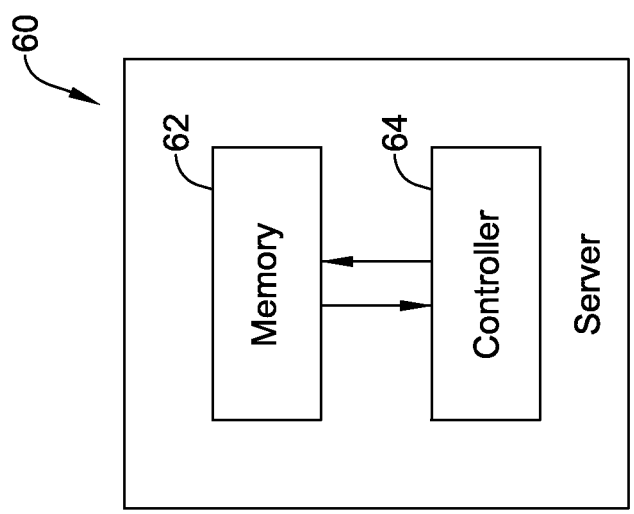
FIG. 5 is a schematic view of a security system monitoring server in accordance with an embodiment of the disclosure.

FIG. 5 provides a schematic diagram of an illustrative security system monitoring server 60 that may provide monitoring services to a plurality of home security systems and/or portable security devices. The illustrative security system monitoring server 60 includes a memory 62 and a controller 64 that is operably coupled to the memory 62. In one example, the memory 62 is configured to store among other things a plurality of user accounts, where each user account includes information about a corresponding customer as well as a link to a home security system that protects a building (e.g. home) associated with the user account. At least one of the user accounts further includes a link to a portable security device that is configured to be hand carried by a user to a space that is remote from the building associated with the user account. A physical location of the portable security device may be reported to the security system monitoring server 60 and stored in the corresponding user account. It is contemplated that an "account" as used in this document may be a single account (e.g. represented by a single account number) of the remote monitoring service or two or more accounts (each represented by a different account number) that are linked together to function as a single account.

The controller 64 of the security system monitoring server 60 may be configured to receive alert conditions from the security systems and the portable security devices that are linked to the plurality of user accounts stored by the security system monitoring server 60. For each alert condition received from the home security systems, the controller 64 may output an indication of the alert condition along with at least some of the information associated with the corresponding user account to personnel of the security system monitoring service. Likewise, for each alert condition received from the portable security devices, the controller 64 may provide an indication of the alert condition along with at least some of the information associated with the corresponding user account to personnel of the security system monitoring service. In some cases, for each alert condition received, the controller 64 may output an indication of the alert condition along with at least some of the information associated with both the home security system and the portable security device that are linked to the corresponding user account to personnel of the security system monitoring service. The personnel of the security system monitoring service may use this reported information to take appropriate action.

The indications for the alert conditions may come from a variety of sources and take a variety of forms. For example, in some cases, the indication for an alert condition received from a home security system may include a display object for viewing on a display. The display object may include a description of the alert condition, a live video and/or audio feed, a physical address of the building protected by the home security system, contact information for the homeowner, contact information for the authorities that serve the physical address of the building, and/or any other suitable information. Some or all of this information may be pulled from the user account associated with the home security system that issued the alert condition. In some cases, the display is a display used by personnel of the security system monitoring service, a display of the homeowners mobile device, a display of a wall mounted security panel of the home security system, and/or any other suitable display.

Likewise, the indication for an alert condition received from a portable security device may include a display object for viewing on a display. The display object may include a description of the alert condition, a live video and/or audio feed, a physical address of the remote space protected by the portable security device, contact information for the homeowner, contact information for the authorities that serve the physical address of the remote space protected by the portable security device, and/or any other suitable information. Some or all of this information may be pulled from the user account associated with the portable security device that issued the alert condition. In some cases, the display is a display used by personnel of the security system monitoring service, a display of the homeowners mobile device, a display of a wall mounted security panel of the home security system, and/or any other suitable display.

Figure 6:
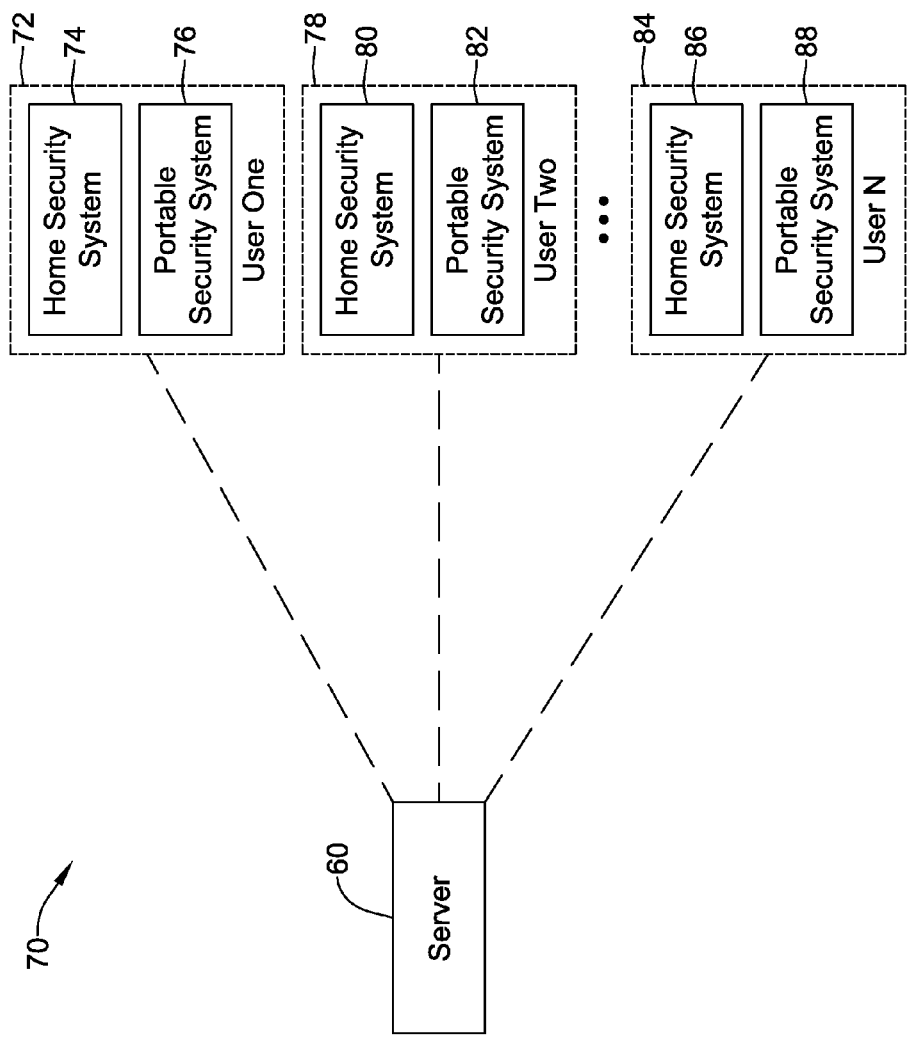
FIG. 6 is a schematic view of an illustrative security system including the security system monitoring server of FIG. 5.

As noted, the security system monitoring server 60 may provide monitoring services to a plurality of security systems. FIG. 6 provides a schematic illustration of a monitoring system 70 in which the security system monitoring server 60 is operably coupled with a plurality of user's systems. As illustrated, a USER ONE 72 includes a home security system 74 and a portable security system 76. In the example shown, the home security system 74 and the portable security system 76 both communicate with the security system monitoring server 60, sometimes linked to a common account associated with USER ONE 72. A link to USER ONE's home security system 74 may include, for example, a unique security code and/or a network address. Likewise, a link to USER ONE's portable security system 76 may include a unique security code and/or a network address. In the example shown, a USER TWO 78 includes a home security system 80 and a portable security system 82. The home security system 80 and the portable security system 80 both communicate with the security system monitoring server 60, sometimes linked to a common account associated with USER TWO 78. There may be any number of users, up to and including a USER N 84 that includes a home security system 86 and a portable security system 88. The home security system 86 and the portable security system 88 both communicate with the security system monitoring server 60, sometimes linked to a common account associated with USER N 84. It will be appreciated that the security system monitoring server 60 may store account information for each of the users, as discussed above with respect to FIG. 5.

Figure 7:
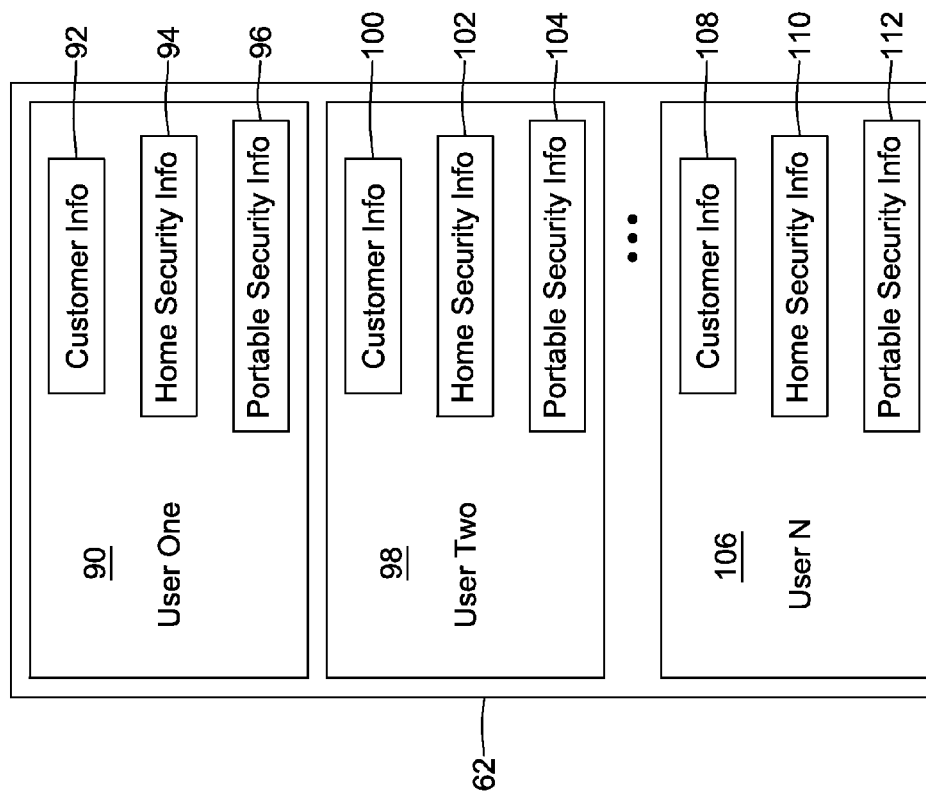
FIG. 7 is a schematic view of illustrative user accounts stored in the memory forming part of the security system monitoring server of FIG. 5.

FIG. 7 is a schematic illustration of some of the information that may be stored in the memory 62 of the security system monitoring server 60 of FIG. 5. For a USER ONE 90, which may for example correspond to the USER ONE 72 shown in FIG. 6, the memory 62 may store customer information 92, home security system information 94 and remote security information 96. The customer information 92 may include, for example, a billing address, account numbers and the like. The home security system information 94 may include, for example, information that identifies the security equipment that forms the home security system, a network address, user name, and/or password information or the like for communicating with the home security system, security codes, the physical location of the home, the contact information for the homeowner (e.g. telephone number, email address, SMS address, etc.) and/or any other suitable information. The remote security information 96 may, for example, include information that identifies the abilities of the remote security system, a network address, user name, and/or password information or the like for communicating with the portable security system, security codes, a current physical location of the portable security device and/or and other suitable information.

For a USER TWO 98, which may for example correspond to the USER TWO 78 shown in FIG. 6, the memory 62 may store customer information 100, home security system information 102 and remote security information 104. Likewise, for a USER N 106, which may for example correspond to the USER N 84 shown in FIG. 6, the memory 62 may store customer information 108, home security system information 110 and remote security information 112. In some cases, one or more of the USERS 90, 98 and 106 may not have a portable security device associated with the user account. For these users, the home security system may not be extended to a remote location.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A portable security device configured to be used in a remote living space within a building that is remote from a home that is outfitted with a home security system, wherein the home security system is linked to a user account of a security system monitoring service, the portable security device comprising:
   a portable housing;
   a sensor secured relative to the portable housing, the sensor configured to detect an indication of intrusion into the remote living space;
   a local alert device secured relative to the housing;
   a memory for storing account information suitable for linking the portable security device to the same user account of the security system monitoring service in which the home security system of the home is linked;
   a communications module secured relative to the housing and configured to communicate with the security system monitoring service linked to the home security system of the home at least in part through an Internet connection; and
   a controller secured relative to the housing, the controller operatively coupled to the sensor, the local alert device, the memory, and the communications module, the controller configured to provide a localized alert via the local alert device when the sensor detects the indication of intrusion into the remote living space, the controller further configured to use the account information stored in the memory and the communication module to communicate with and notify the security system monitoring service at least in part through the Internet connection when the indication of intrusion into the remote living space is detected by the sensor so as to extend the user account linked to the home security system of the home to include the remote living space.

2. The portable security device of claim 1, further comprising one or more of a smoke detector and a CO detector.

3. The portable security device of claim 1, wherein the sensor comprises one or more of a motion sensor, a proximity sensor, an image capture device, and a video capture device.

4. The portable security device of claim 1, wherein the sensor comprises a glass break sensor.

5. The portable security device of claim 1, wherein the local alert device comprises an audible alarm generator.

6. The portable security device of claim 1, wherein the local alert device comprises a visual alarm generator.

7. The portable security device of claim 1, wherein the controller is further configured to cause a message to be sent to a mobile device of a user when the indication of intrusion into the remote living space is detected by the sensor.

8. The portable security device of claim 1, further comprising a panic button that is operably coupled to the controller and the communications module such that pressing the panic button causes the communications module to send a panic message to local police authorities and/or to the security system monitoring service.

9. A security system monitoring server, comprising:
   a memory for storing a plurality of user accounts, each user account including information about a corresponding customer including:
      a physical address of a primary building protected by a security system;
      a link to the security system that protects the primary building associated with the user account;
   at least one of the user accounts also includes:
      a physical address of a remote living space in a secondary building that is remote from the primary building;
      a link to the portable security device associated with the user account;
   wherein the portable security device is configured to be hand carried by a user to the remote living space in the secondary building and is configured to communicate with the security system monitoring server at least in part through an Internet connection; and
   a controller operatively coupled to the memory, the controller configured to receive alert conditions from the security systems and the portable security devices that are linked to the plurality of user accounts, and for each alert condition received from the security systems, the controller outputting an indication of the alert condition along with at least some of the information associated with the corresponding user account including the physical address of the primary building protected by the security system, and for each alert condition received from the portable security devices at least in part through the Internet connection, the controller outputting an indication of the alert condition along with at least some of the information associated with the corresponding user account including the physical address of the secondary building.

10. The security system monitoring server of claim 9, wherein the indication of the alert condition received from the security system comprises a display object for viewing on a display.

11. The security system monitoring server of claim 9, wherein the indication of the alert condition received from the portable security device comprises a display object for viewing on a display.

12. The security system monitoring server of claim 9, wherein the link to the security system comprises a unique security code.

13. The security system monitoring server of claim 9, wherein the link to the security system comprises a network address.

14. The security system monitoring server of claim 9, wherein the link to the portable security device comprises a unique security code.

15. The security system monitoring server of claim 9, wherein the link to the portable security device comprises a network address.

16. A non-transitory computer-readable storage medium with an executable program stored thereon, wherein the executable program instructs a portable security device having one or more sensors that can sense an indication of intrusion into a space of a first building in which the portable security device is located and a controller coupled to the one or more sensors to perform the following:
    activate the one or more sensors;
    monitor for the indication of intrusion into the space in the first building in which the portable security device is located via the one or more activated sensors; and
    if the indication of intrusion into the space of the first building in which the portable security device is located is detected, send an alert message at least in part through an Internet connection to a security system monitoring service, the alert message referencing a user account of the security system monitoring service that is also associated with a security system of a second building that is located remote from the first building.

17. The non-transitory computer-readable storage medium of claim 16, wherein the alert message comprises a location identifier that identifies a location of the portable security device.

18. The non-transitory computer-readable storage medium of claim 16, wherein the alert message comprises one or more of an intrusion alarm, a temperature alarm, a humidity alarm, an air quality alarm, and a fire alarm.

* * * * *